(12) United States Patent
Belanger et al.

(10) Patent No.: US 8,512,498 B2
(45) Date of Patent: Aug. 20, 2013

(54) WAVED WOOD ASSEMBLY AND METHOD OF MAKING SAME

(75) Inventors: Alain Belanger, Kedwick (CA); Martin Blais, Thetford Mines (CA)

(73) Assignee: Corruven Canada Inc., Kedgwick (Nouveau-Brunswick) (CA)

( * ) Notice: Subject to any disclaimer, the term of this patent is extended or adjusted under 35 U.S.C. 154(b) by 0 days.

(21) Appl. No.: 13/132,587

(22) PCT Filed: Nov. 27, 2009

(86) PCT No.: PCT/CA2009/001739
§ 371 (c)(1),
(2), (4) Date: Jun. 2, 2011

(87) PCT Pub. No.: WO2010/060219
PCT Pub. Date: Jun. 3, 2010

(65) Prior Publication Data
US 2011/0265942 A1 Nov. 3, 2011

Related U.S. Application Data

(60) Provisional application No. 61/118,532, filed on Nov. 28, 2008.

(30) Foreign Application Priority Data

Jan. 20, 2009 (CA) ...................................... 2650873

(51) Int. Cl.
*B29C 65/00* (2006.01)
*B29C 65/48* (2006.01)

(52) U.S. Cl.
USPC ............ 156/206; 156/196; 156/205; 156/210

(58) Field of Classification Search
USPC .......................... 156/196, 199, 205–208, 210
See application file for complete search history.

(56) References Cited

U.S. PATENT DOCUMENTS

| | | | |
|---|---|---|---|
| 2,058,334 A | 10/1936 | Mason | |
| 2,312,332 A | 3/1943 | Gramelspacher | |
| 3,003,204 A | 10/1961 | Bryant | |
| 3,583,119 A | 6/1971 | Kann | |
| 3,927,438 A | 12/1975 | Blake | |
| 3,975,882 A | 8/1976 | Walter | |
| 4,035,538 A | 7/1977 | Maekawa et al. | |
| 4,057,947 A | 11/1977 | Oide | |
| 4,121,386 A | 10/1978 | Perez | |
| 4,142,931 A | 3/1979 | Viol et al. | |

(Continued)

FOREIGN PATENT DOCUMENTS

| | | |
|---|---|---|
| CA | 2186586 | 10/1995 |
| CA | 2570094 | 6/2008 |

(Continued)

*Primary Examiner* — Jeff Aftergut
*Assistant Examiner* — Carson Gross
(74) *Attorney, Agent, or Firm* — Sutherland Asbill & Brennan LLP

(57) ABSTRACT

The waved wood assembly can have a flexible support layer onto the face(s) of which one or more wood sheet layer(s) are adhered by an adhesive. The waved wood product can maintain its waved shape when freestanding. It can exhibit significant elasticity characteristics. It can have very accentuated waves, i.e. waves that span a greater thickness for a given number of waves per unit of dimension.

14 Claims, 8 Drawing Sheets

(56) References Cited

U.S. PATENT DOCUMENTS

| | | |
|---|---|---|
| 4,428,993 A | 1/1984 | Kohn et al. |
| 4,429,012 A | 1/1984 | Danko |
| 4,722,161 A | 2/1988 | Young |
| 4,748,067 A | 5/1988 | Cline |
| 4,773,200 A | 9/1988 | Young |
| 4,816,103 A | 3/1989 | Ernest |
| 5,218,808 A | 6/1993 | Ardley |
| 5,239,801 A | 8/1993 | Adams |
| 5,258,087 A | 11/1993 | Symons |
| 5,457,925 A | 10/1995 | Koedyker |
| 5,495,697 A | 3/1996 | Bischel et al. |
| 5,619,833 A | 4/1997 | Neff |
| 5,738,924 A | 4/1998 | Sing |
| 5,791,118 A | 8/1998 | Jordan |
| 5,948,198 A * | 9/1999 | Blyt ............................ 156/206 |
| 6,254,951 B1 | 7/2001 | Marmalich |
| 6,493,898 B1 | 12/2002 | Woods et al. |
| 6,715,188 B1 | 4/2004 | Jackson et al. |
| 6,990,777 B2 | 1/2006 | Poliacek et al. |
| 7,269,927 B2 | 9/2007 | Savard |
| 2005/0241267 A1 | 11/2005 | Wu |
| 2006/0260245 A1 | 11/2006 | Schoolcraft, Sr. |

FOREIGN PATENT DOCUMENTS

| | | |
|---|---|---|
| FR | 918265 | 2/1947 |
| FR | 1093518 | 5/1955 |
| GB | 523724 | 7/1940 |
| GB | 560913 | 4/1944 |
| GB | 1360105 | 7/1974 |
| GB | 2087793 A | 6/1982 |
| GB | 2453358 A | 4/2009 |
| WO | 95/26880 | 10/1995 |
| WO | 99/63180 | 12/1999 |
| WO | 0185409 A1 | 11/2001 |
| WO | 2005105426 A1 | 11/2005 |
| WO | 2008067662 A1 | 6/2008 |
| WO | WO 2008/067662 * | 6/2008 |

* cited by examiner

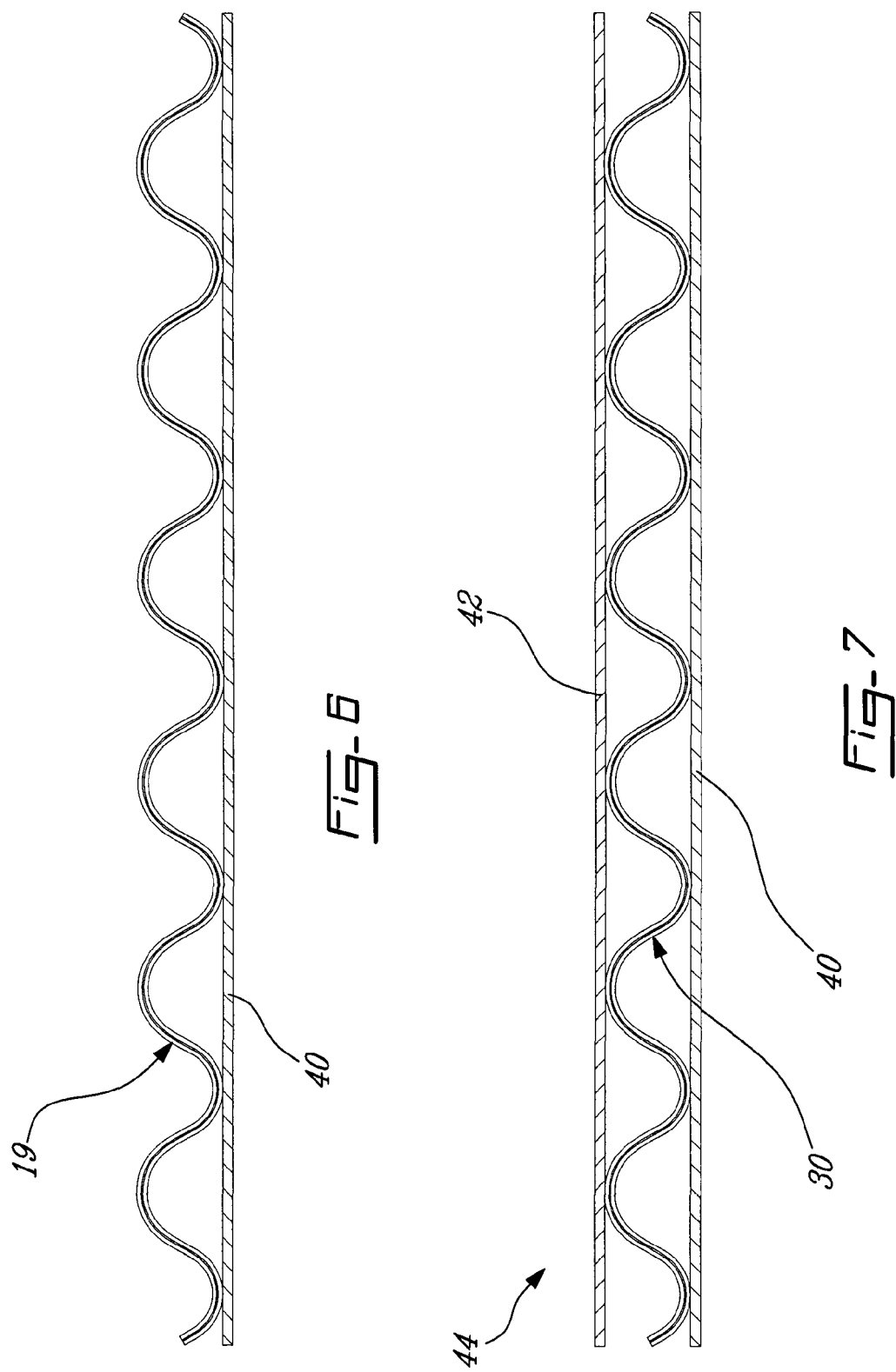

WAVED WOOD ASSEMBLY AND METHOD OF MAKING SAME

CROSS-REFERENCE TO RELATED APPLICATIONS

This application is a national stage application under 35 U.S.C. §371 of PCT/CA2009/001739, filed Nov. 27, 2009, which claims priority of U.S. provisional application No. 61/118,532, filed Nov. 28, 2008 by applicant, and Canadian patent application no. 2,650,873, filed Jan. 20, 2009 applicant, the contents of each of which are hereby incorporated by reference.

BACKGROUND

Although some undulated wood assemblies were known, there remained room for improvement. In particular, many limitations were known to former waved wood assemblies which limited their versatility. There thus remained room for improvement, particularly as to the characteristics of elasticity and height, or accentuation, of the waves.

SUMMARY

These needs were addressed particularly in new constructions and production processes described and claimed hereinbelow. In particular, the waved wood assembly can have a flexible support layer onto the face(s) of which one or more wood sheet layer(s) are adhered by an adhesive. The waved wood product can maintain its waved shape when freestanding. It can exhibit significant elasticity characteristics. It can have very accentuated waves, i.e. waves that span a greater thickness for a given number of waves per unit of dimension.

As described in further detail below, a flexible support layer can be used as a flexible support to the wood sheet layer(s) of the waved wood product. In one embodiment, the flexible support layer is sandwiched between two wood sheet layers, each adhered onto a respective side thereof. The flexible support layer can be a Kraft paper, or any suitable fabric, mesh, or other flexible material, for instance. Both wood sheet layers have wood grain oriented in the same longitudinal orientation in the assembly. The second wood sheet layer can be omitted in some embodiments.

The layers are first adhered together, then the assembly can be flexed—a process similar to folding around a given radius, parallel to the wood grain orientation, at a plurality of transversal locations—prior to being formed into the waved shape and set into shape by the adhesive. Flexing the assembly prior to forming can significantly contribute to providing a substantial elasticity to the final product, i.e. it can be stretched transversally or curved to a certain extent and subsequently recover its original shape.

In accordance with one embodiment, a reactivatable adhesive, which can be a dry adhesive for instance, is used to adhere the layers together. Then, during the step of shaping, the adhesive is reactivated to set the shape of the final product. In accordance with another embodiment, the layers can be adhered together with an adhesive which is only partially activated, this can be a water-based adhesive which is not quite entirely set for instance, and the setting of the adhesive is completed as the assembly is maintained in the waved shape. Flexing is optional in this latter embodiment.

The elasticity of the structure from a given, "memorized" waved shape, can result from the fabrication process in which the wood sheet layer or layers can first be adhered to the flexible support layer with an adhesive which can be later reactivated, such as by heat application of a heat-activated adhesive, for instance. The wood sheet and support layer assembly is then flexed, such as with a machine called a flexer, to stretch the wood fibres apart from each other, transversally to the longitudinal wood grain orientation, thereby rendering the assembly flexible transversally to the longitudinal wood grain orientation. The assembly can thus be shaped into a transversally waved shape. This can be achieved with a press having appropriate mating wave-shaped moulds for instance, or a machine that does a similar process on-line. The adhesive can then be reactivated so that the assembly keeps its waved shape thereafter.

The resulting waved wood product can then have a substantial amount of transversal elasticity which can be due at least partially to the re-adhesion of the wood fibres with specific locations on the flexible support which can occur during the step of reactivation. Because it thenceforth maintains a memory of its waved shape, it can be simply laid onto and adhered to a panel and used in a wide variety of applications. The panel can be a flexible wood sheet with a wood grain orientation oriented in the transversal orientation, for instance, or made of another material such as aluminium or composites. The panel can be flat or flexible. The waved structure can be sandwiched between two panels. In one embodiment, the waved structure can be adhered onto a flexible wood sheet having a wood grain orientation in the same orientation as the wood grain of the waved structure, and the resulting assembly can thus be flexible and bendable in the transversal direction.

In accordance with one aspect, there is provided a process of making a waved wood product comprising: assembling a flexible support sheet and a first wood sheet with an adhesive therebetween into a flat, stacked assembly, the wood sheet having a given longitudinal wood grain orientation in the stacked assembly and the flexible support sheet being significantly more flexible than the first wood sheet; shaping the stacked assembly into a waved shape in the direction transverse to the wood grain orientation and setting a waved shape of the waved wood assembly which independently maintains its waved shape thereafter.

In accordance with another aspect, there is provided a wood product comprising a stacked assembly having a first wood sheet adhered to a flexible support sheet by an adhesive, the wood sheet having a given longitudinal wood grain orientation; the stacked assembly being waved in a direction transverse to the wood grain orientation and being elastically deformable in the transverse direction.

In accordance with another aspect, there is provided a process of making a wood product comprising: assembling a flexible support sheet sandwiched between two wood sheets with an adhesive therebetween into a flat, stacked assembly, both wood sheets having a same longitudinal wood grain orientation in the stacked assembly; flexing the stacked assembly in a direction transverse to the wood grain orientation, thereby rendering the stacked assembly flexible in the transverse direction; and shaping the flexible stacked assembly into a waved shape in the direction transverse to the wood grain orientation and setting the waved shape of the waved wood assembly which independently maintains its waved shape thereafter.

DESCRIPTION OF THE FIGURES

In the appended figures,

FIG. 6 is a cross-sectional view showing the waved wood assembly adhered onto a panel;

FIG. 7 is a cross-sectional view showing the waved wood assembly sandwiched between and adhered to two wood panels;

DETAILED DESCRIPTION

Figure 1:
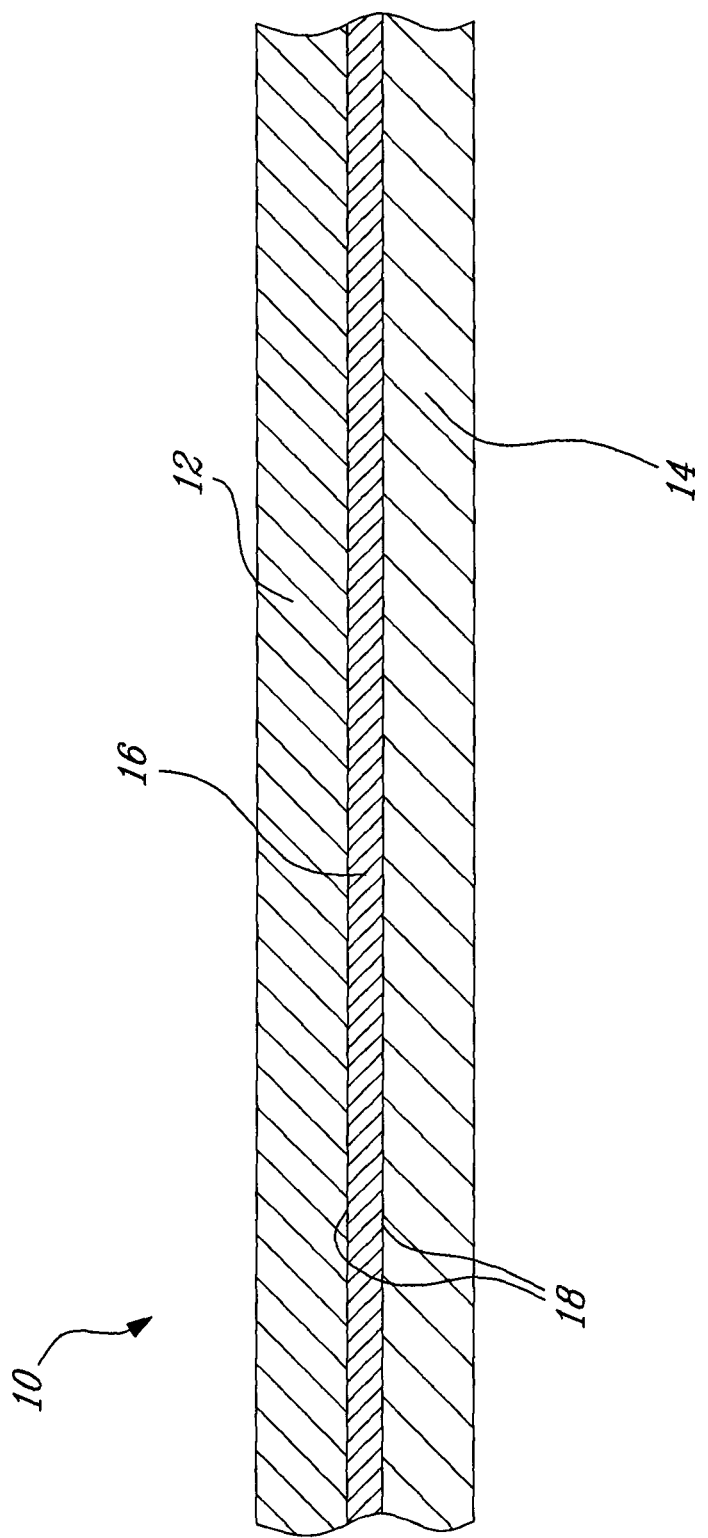
FIG. 1 is a cross-sectional view, enlarged, of a stacked assembly.

FIG. 1 shows an example of a stacked assembly 10. The stacked assembly 10 includes two wood sheets 12, 14 with a flexible support sheet 16 therebetween. The flexible support sheet 16 is adhered to the two wood sheets by an adhesive 18 which can be reactivated at a later time. The flexible support sheet 16 can be a Kraft paper, or any alternate suitable flexible layer, such as a film, a foil, a fabric, a mesh, for example. By flexible, what is to be understood is that the layer has a flexibility which is significantly greater than that of the wood sheet layers 12 and 14.

In the illustrated embodiment, the stacked assembly 10 is obtained by heat pressing the two wood sheet layers 12 and 14, and the flexible support sheet 16 in a manner that the presence of heat during the pressing activates the adhesive 18. It will be noted here that both wood sheets 12 and 14, have a wood grain orientation 19 (see FIG. 2) and that in the assembly, the wood grain orientation 19 of both wood sheets 12 and 14 are oriented to be parallel and to coincide together.

Figure 2:
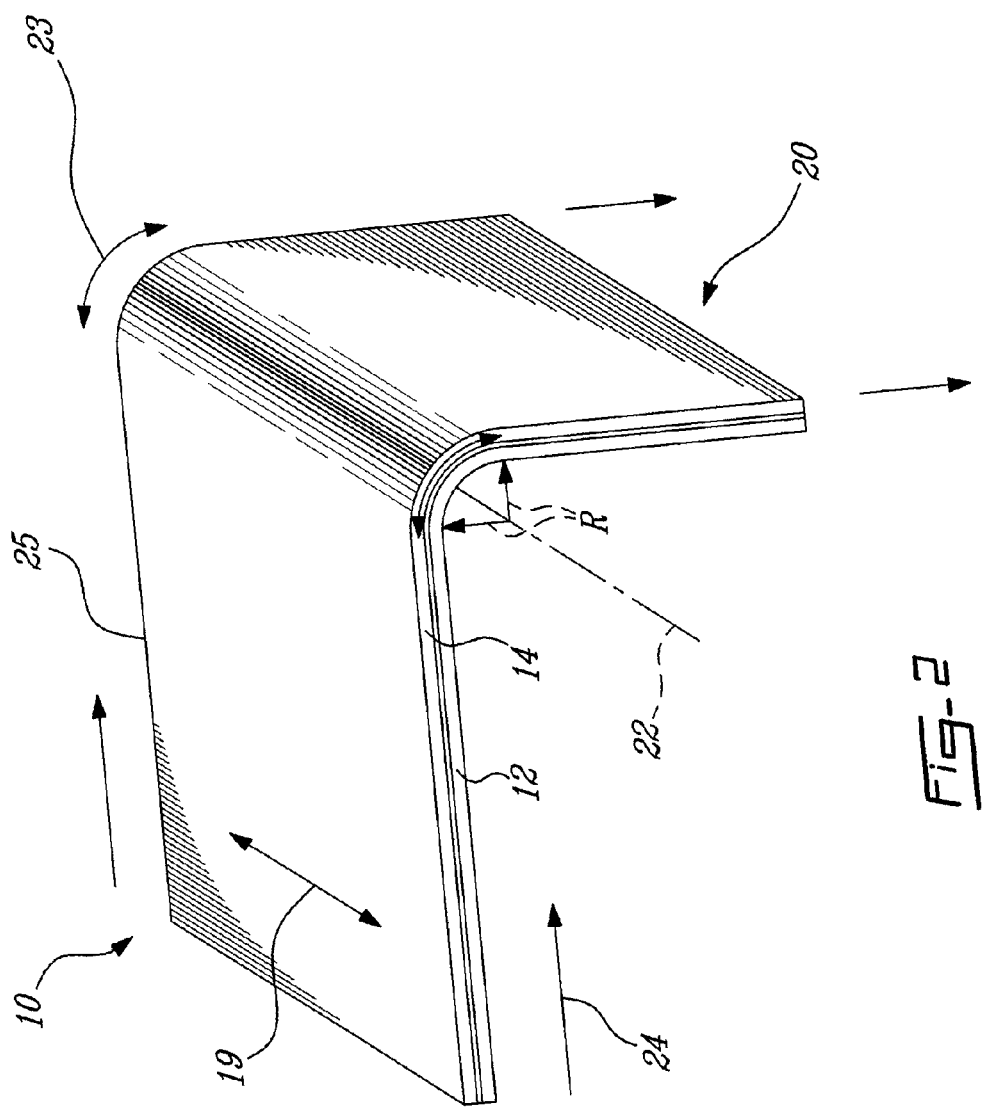
FIG. 2 is a schematic perspective view showing the flexing of the stacked assembly of FIG. 1.

Turning now to FIG. 2, the somewhat rigid and flat stacked assembly 10 is then flexed into a flexible stacked assembly 20. Flexing is achieved in this example by folding the stacked assembly 10 in a direction 24 transverse to the longitudinal wood grain orientation 19 of both wood layers 12 and 14, i.e. around an axis 22 parallel to the wood grain orientation 19 and distant from the stacked assembly 10 by a given radius R. The flexing step is first done on a first side of the stacked assembly (shown) which stretches (23) the wood sheet fibres of the wood sheet 14 which is radially outward, apart from one another. Typically the flexing radius R is selected in order to obtain a satisfactory stretch without inducing splitting in the wood. Typically this flexing of the stacked assembly 10 is affected while gradually displacing the stacked assembly in the transversal direction 24 so as to stretch 23 the wood fibres along the entire transversal length 25 of the stacked assembly 10.

While the wood fibres of the radially outer wood sheet 14 are being stretched apart 23 from one another, the wood fibres of the radially inner wood sheet 12 are being compressed towards one another, which typically does not induce significant flexibility. The flexing step can thus be repeated on the other side of the stacked assembly 10 to gain flexibility in the other wood sheet 14.

In an industrial setting, the flexing of the stacked assembly 10 can be effected using a flexer machine. Such machines are known in the art and are commonly used to make veneer (wood sheets) flexible and supple. Flexer machine are available for instance from the company Veneer Systems Inc. in Buffalo, N.Y., USA, and from a number of other companies.

After the flexing operation has been effected with both wood sheets 12 and 14 of the flexible stacked assembly 20, the flexible stacked assembly 20 is flexible in the transversal direction, i.e. in the direction in which it has been flexed. It will be noted here for greater clarity that the flexing is not done in the longitudinal orientation 19 of the wood grain, because this would typically damage the wood fibres, but rather only in the transversal direction 24 to stretch the fibres apart from one another.

Figure 3:
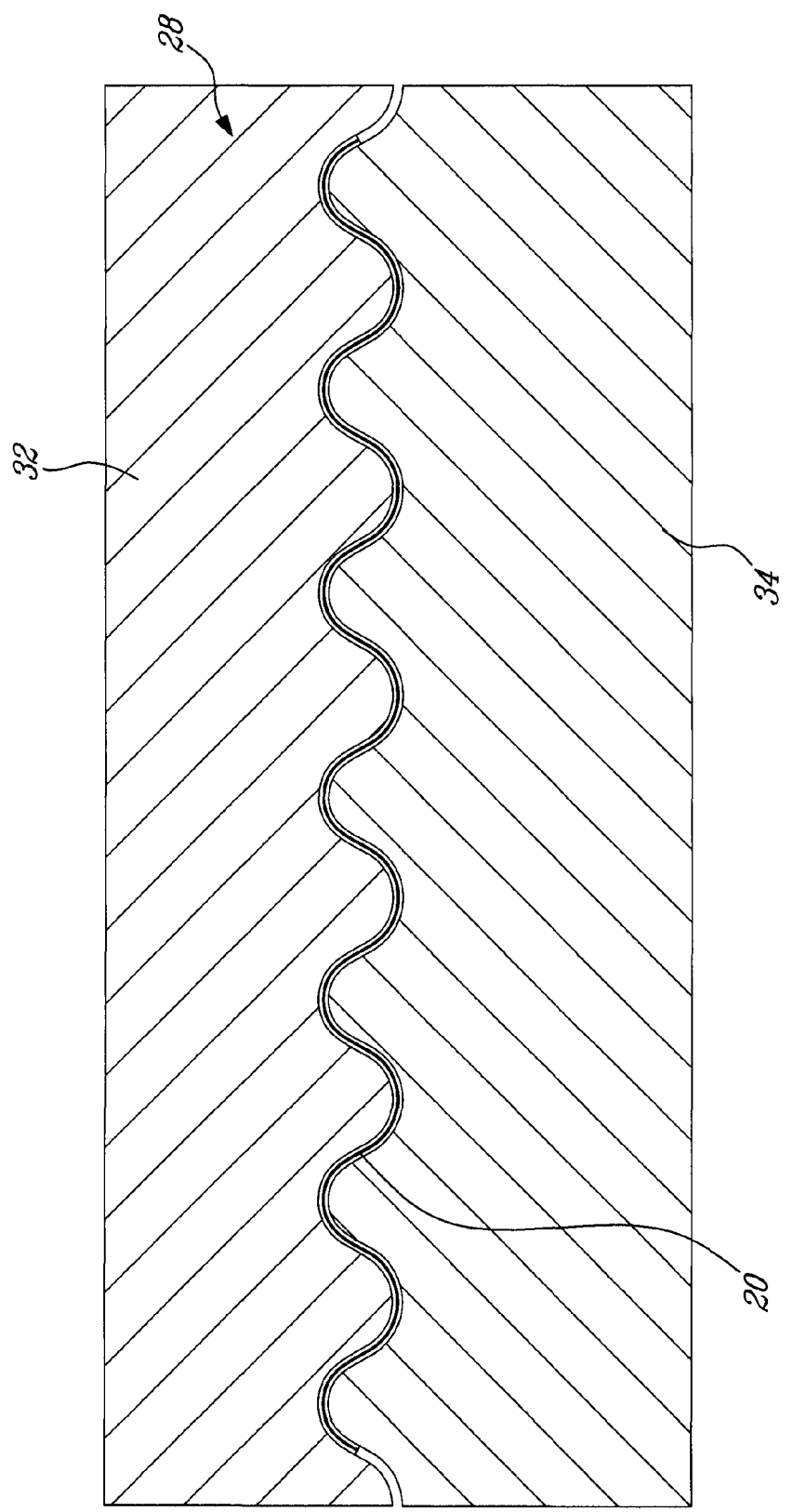
FIG. 3 is a schematic cross-sectional view showing the shaping of the flexible stacked assembly of FIG. 2 into a transversally waved shape.

Turning to FIG. 3, the now flexible stacked assembly 20 is then shaped into a waved shape. The adhesive 18 between the flexible support sheet 16 and the wood sheets 12 and 14 (see FIG. 1) can then be re-activated to set the waved shape of the waved wood assembly 30, which it will thereafter maintain with elasticity. In the illustrated embodiment, the shaping of the flexible stacked assembly 20 can be realised for instance in a waved mould having mating male member 32 and female member 34. In the embodiment shown in FIG. 3, the male member 32 and female member 34 are part of a heat press, which can generate heat in the male 32 and/or female member 34 to reactivate the thermally reactivatable adhesive and set the waved shape of the stacked assembly.

Using the above described process, the waves can be significantly more pronounced than what was previously achieved. For instance, the area connecting the waves can have an angle α of more than 45° from the transversal orientation, preferably above 50°. In embodiments where structural resistance is an important design consideration, an angle α of between 55 and 65°, preferably 60°, will be favoured as tests have shown a maxima of structural resistance at this angle.

Figure 4:
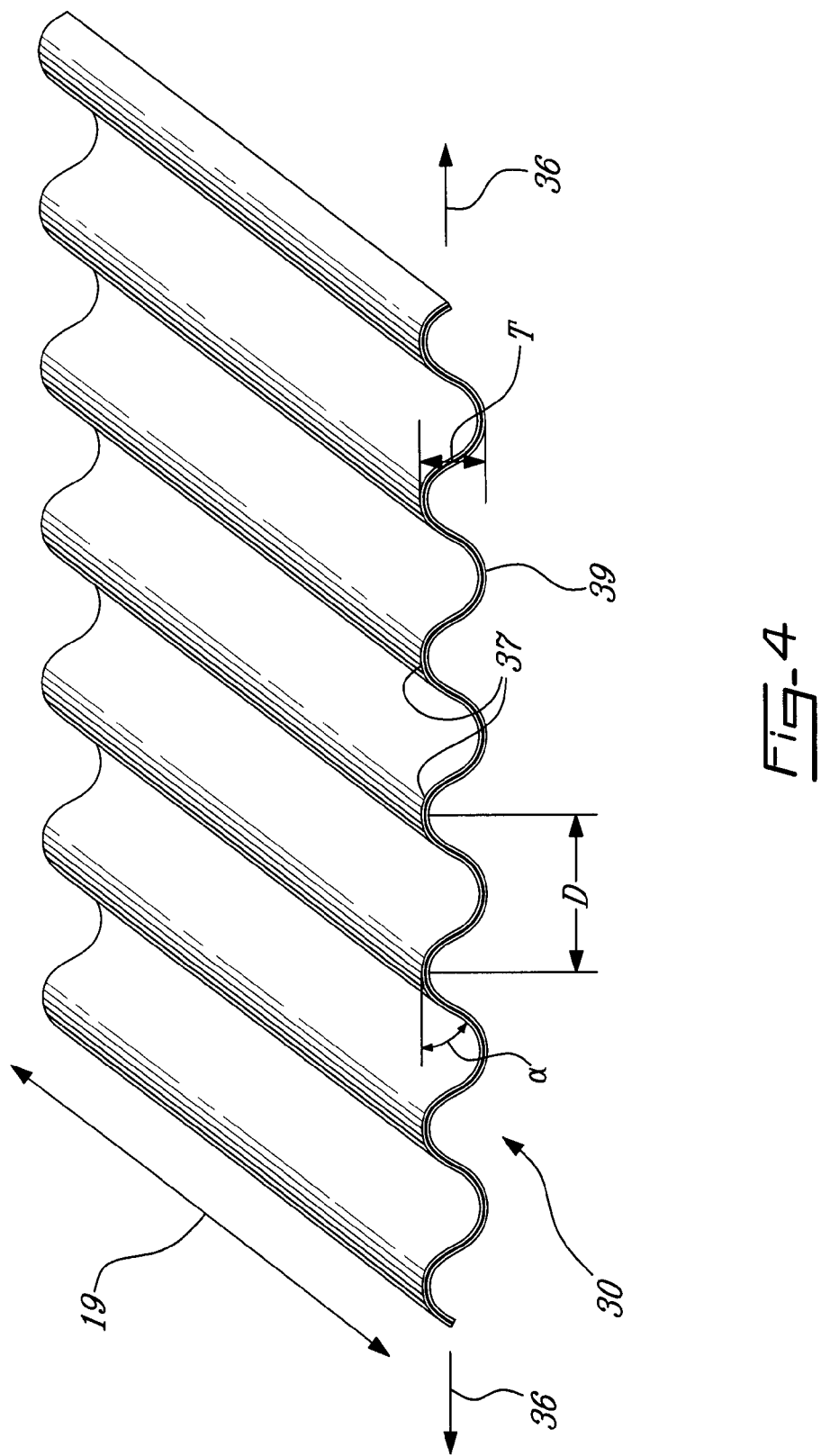
FIG. 4 is a cross-sectional view showing transversal stretching of the waved wood assembly.
Figure 5:
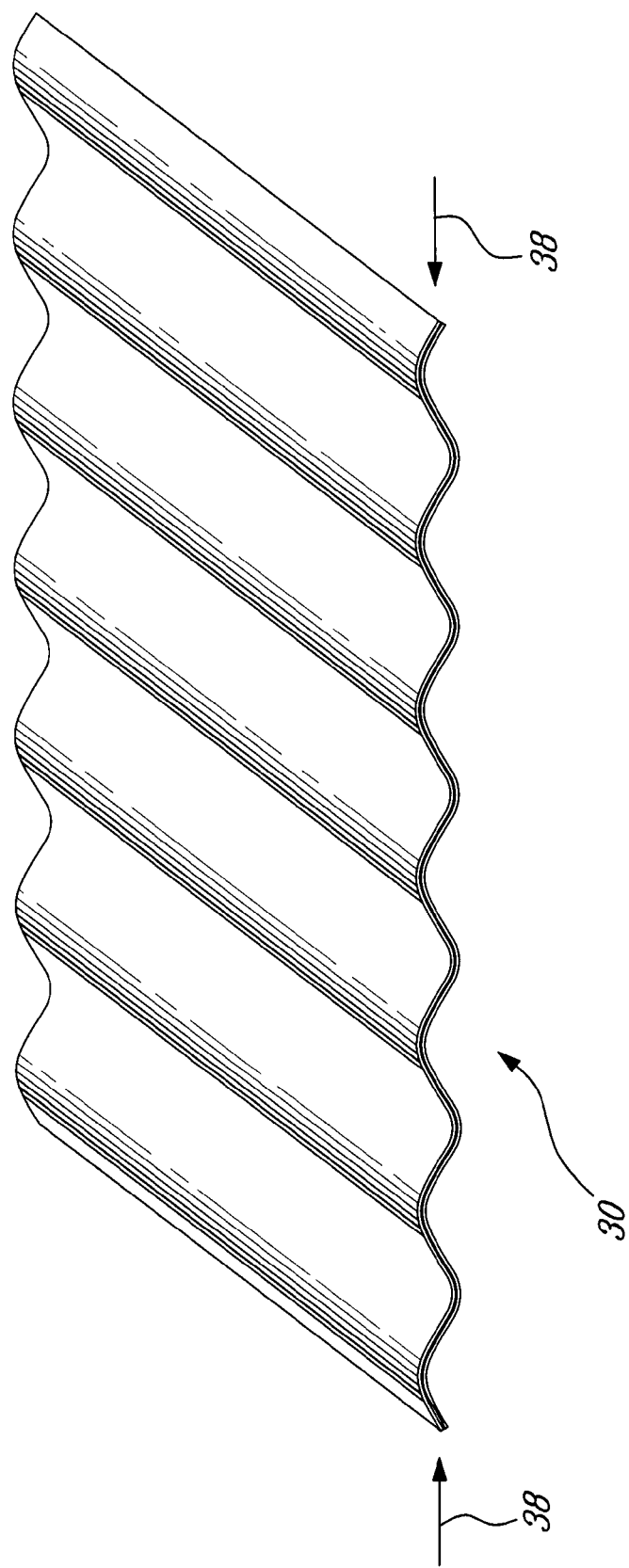
FIG. 5 is a view similar to FIG. 4 showing the stretched waved wood assembly exerting a returning force.

When removed from the press, the waved wood assembly 30 substantially retains its shape at room temperature, such as depicted in FIG. 4. If the waved wood assembly 30 is stretched in a direction 36 transverse to the orientation 19 of the wood grain, the waved wood assembly 30 exerts a returning force 38 which tends to return it to its original shape due to its elasticity, such as depicted in FIG. 5.

The elastic characteristics of the waved wood assembly 30 can also be witnessed when applying a downward pressure onto the maximas 37, or summits, of the waves while the minimas 39, or depressions, are supported from underneath, such as when the waved wood assembly 30 is being compressed between two flat surfaces, which tends to force the waved wood assembly 30 into a transversal stretch. The waved wood assembly 30 can also be curved around a radius given this elasticity.

It will be understood that the expression "elastic" as used herein refers to a substantial amount of elasticity, which can be felt and viewed when manipulating the assembly. An elastic waved wood assembly as described herein can be elastically stretched to at least 105% of its original shape, and preferably at least to 110% or 120% or more, depending on the configuration of the waved shape. The elastic waved wood assembly can also be flexed (curved) in the transversal direction. Tests have shown that such a waved wood assembly 30 can even be made elastically deformable to a point where it can be pressed flat and thereafter substantially recover its set waved shape.

In an alternate embodiment, two wood veneers are adhered to a flexible support layer using an adhesive which is partially activatable. For instance, a water-based PVAc adhesive can be used for instance and not completely set while the assembly is maintained assembled in a press. Because the adhesive is not completely set, it maintains wetness which softens the assembly and allows it to maintain a given amount of flexibility. The assembly can thus be shaped into its waved shape, during which step the setting of the adhesive can be completed, thereby setting the waved shape of the assembly. In accordance with this second embodiment, flexing prior to shaping can be omitted, however the resulting assembly may be significantly less elastic than in a process where flexing is used.

The resulting waved wood assembly 30 can be used as a waved wood product in a variety of applications.

Figure 9A:
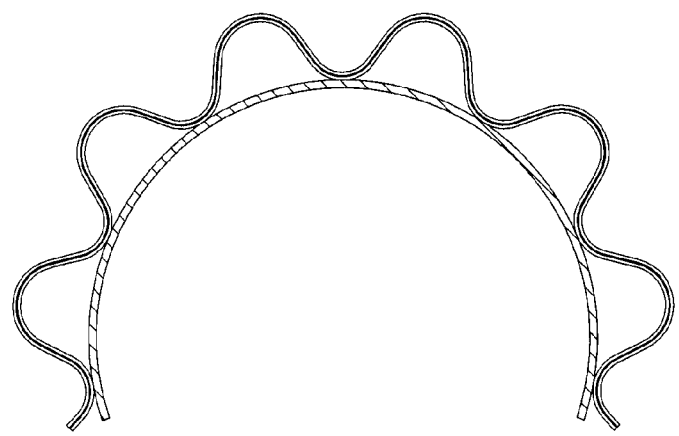
FIGS. 9A to 9C are cross-sectional views of alternate embodiments each showing a waved wood assembly adhered onto a transversally flexible panel, shown flexed in different configurations.
Figure 9B:
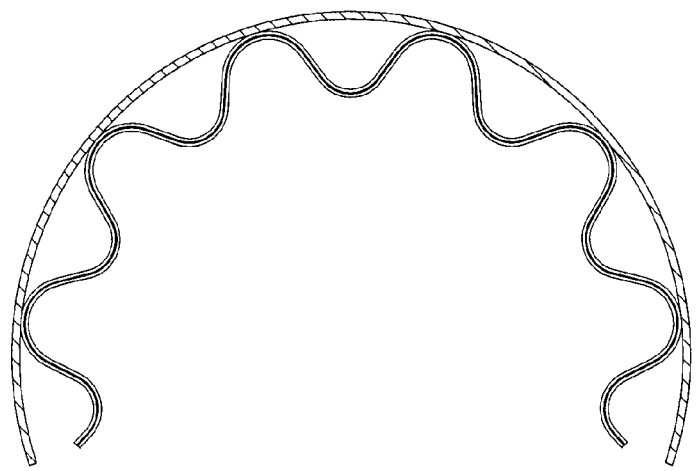
Figure 9C:
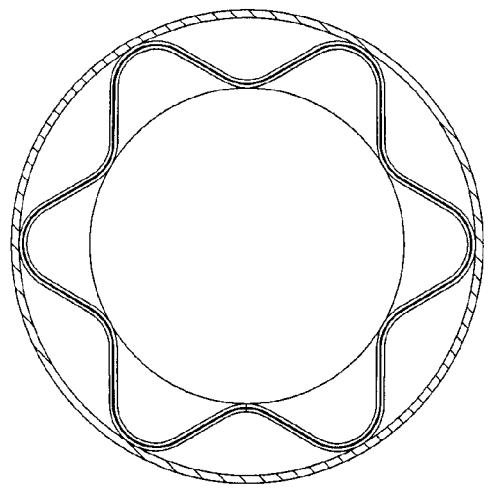

In FIG. 6 for instance, the waved wood assembly 30, which retains its waved shape without external influence, can simply be laid onto and adhered to a first panel 40. The panel 40 can be, for instance, a wood sheet with a wood grain orientation perpendicular to the wood grain orientation of the waved wood assembly 30. If flexibility is desired, the panel 40 can be instead a flexible wood sheet having a wood grain orientation parallel to the wood grain orientation of the waved wood assembly 30, for example, and a significantly elastic waved wood assembly will be used as the core, to obtain an assembly which is flexible in the transverse direction, such as shown in FIG. 9A to 9C. It is not recommended however to use a rigid wood sheet having a wood grain orientation parallel to the wood grain of the waved wood assembly 30, because such an assembly may be prone to warping over time. In alternate embodiments, the panel 40 can also be of another material, such as aluminium or composites for example.

As shown in FIG. 7, a second panel 42 can then be placed onto the waved wood assembly 30 and adhered thereto to make a structural panel 44. An example of a light weight structural panel having such a construction can have a first panel 40 and second panel 42 made of wood sheets having the same wood grain orientation, the latter being perpendicular to the wood grain orientation of the wood sheets in the waved wood assembly 30, for example.

For the purpose of providing a full description of the embodiments above, some precisions will now be given for indicative purposes only. Kraft paper of 5/1000", 10/1000", or 20/1000", for example can satisfactorily be used as the flexible support layer 16, although other thicknesses can be suitable as well. In particular, thinner Kraft papers can be useful in certain applications. Wood sheets, sometimes also called veneers, are commonly available in thicknesses ranging between 1/16" and 1/128". These and other thicknesses can be used, depending of the application.

The waved wood assembly can be made in a wide variety of dimensions, depending of the end-use application. For instance, for a waved wood assembly having a distance D (see FIG. 4) of 2⅔" between the maximas of the waves when unstretched, thicknesses T of ⅞", ¾", ⅝" and ½" can readily be made, whereas for a distance D of 1¼" between the maximas of the undulations, a thickness T of ¼" can be suitable, for example. It will be noted here that when the waved wood assembly is made for a structural application, a more pronounced angle α, a smaller curving radius (i.e. a less sinusoidal, more triangular shape), and a smaller distance D will be favoured to give the product more structural strength. At the other end of the spectrum, if the waved wood assembly is given simply to provide low-weight thickness to an assembly, and structural resistance is not a priority, the distance D can be made longer, and a lower angle α can be used.

It will be understood that the embodiments described above and illustrated in the attached figures are given for illustrative purposes only and that various modifications thereto and alternate embodiments can be devised in view of specific alternate applications.

Figure 8:
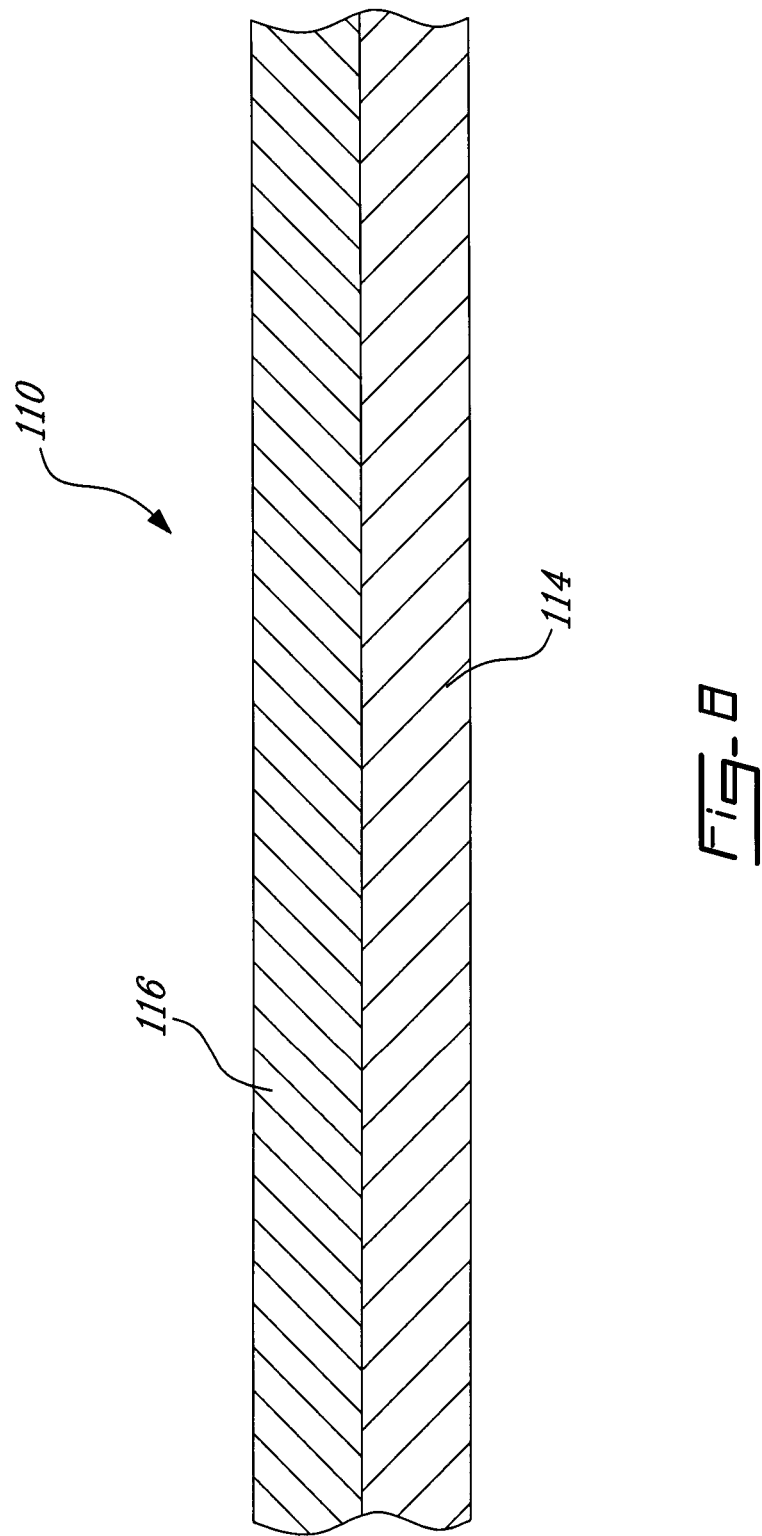
FIG. 8 is a cross-sectional view of an alternate embodiment of a stacked assembly.

For instance, as depicted in FIG. 8, alternate embodiments can use a single wood sheet 114 adhered onto a flexible support layer 116, instead of a flexible support layer 16 sandwiched between two wood sheets 12, 14 as was described above with reference to FIG. 1. A stacked assembly 110 having a single wood sheet 114 adhered onto a flexible support layer 116 can be flexed and shaped into a wave shape in a similar manner as a stacked assembly 10 having two wood sheets 12 and 14, and as described above with reference to FIGS. 2 and 3. The resulting waved wood assembly can have comparable elasticity characteristics than a waved wood assembly 30 having two wood sheets 12 and 14 sandwiching the support layer 16. Alternately, the waved wood assembly can have more than two wood sheets and more than one support layer.

Also, the shape of the waves can vary, but the minimum curving radius of the shape should be maintained sufficiently high (i.e. not too sharp), to reduce the likelihood of splitting of the wood. As discussed above, a smaller curving radius with a longer straight portion between maximas and minimas will be favoured in structural applications, and the straight portions can have an angle α of 60° in such cases.

Also, any suitable flexible support layer can be used as the support sheet. Alternatives to Kraft paper can include fabrics and mesh. Films can also be used, such as manufactured by the company CDM Decor Papers inc. (Drummondville, Canada), or even solar cell foils, such as manufactured by the company Nanosolar under the trademark SolarPly™, to name a few examples. In one embodiment, for instance, a single wood sheet can be adhered to a solar cell foil, and the resulting waved wood assembly can be used as a solar panel, with the exposed side of the solar cell foil being exposed to the light of the sun.

Concerning the adhesive, it will be understood that suitable adhesives which can be reactivated after the wood assembly has been flexed can be used. Heat-reactivatable adhesives can be a convenient choice due to the availability of heat presses, but in alternate embodiments, adhesives which can be reactivated by other means than heat, such as ultra-violet light or microwave radiation for instance, or reactivation by pressure application, can be used as well, depending of the application and of the support layer used. Alternately, adhesives which can be partially set while allowing the assembly to retain some flexibility allowing it to be formed into its waved shape, where the setting can be completed, can also be used as detailed above.

Other processes than those described above can be used in making the aforementioned products.

Waved wood assemblies as taught herein, can be used in a wide variety of applications. For instance, such as shown in FIGS. 9A to 9C, a waved wood assembly can be adhered onto a flexible panel, and the flexibility and elasticity of the waved wood assembly as taught herein can provide the versatility of flexing the resulting assembly to a given curving radius. In FIG. 9A, the waved wood assembly is flexed radially-outwardly, whereas in FIG. 9B, the waved wood assembly is flexed radially-inwardly. Such embodiments can be used in soundproofing applications or packaging applications, for instance. FIG. 9C shows an application of the waved wood assembly which can be used in making a structurally reinforced post, for instance. Tests have shown that it can be possible to curve the assembly around a radius of as low as 1 inch, in certain applications.

In view of the foregoing and given the different possible alternate embodiments and variants, the scope is indicated by the appended claims.

What is claimed is:

1. A process of making a wood product comprising:
assembling a flexible support sheet sandwiched between two wood sheets with an adhesive between the flexible support sheet and each one of the two wood sheets, into a flat stacked assembly with all wood sheets having a same longitudinal wood grain orientation in the stacked assembly, including partially activating the adhesive;
flexing the stacked assembly in a direction transverse to the wood grain orientation, thereby rendering the stacked assembly flexible in the transverse direction; and
subsequently to said flexing, shaping the flexible stacked assembly into a waved shape in the direction transverse to the wood grain orientation and setting the waved shape of the waved wood assembly by setting the adhesive, the waved wood assembly independently maintaining its waved shape thereafter.

2. The process of claim 1 wherein the waved shape has an angle $\alpha$ of above 50° from the transversal orientation.

3. The process of claim 1 wherein the step of assembling includes heat-pressing.

4. The process of claim 1 wherein the step of shaping includes heating the adhesive.

5. The process of claim 1 wherein the flexing includes repeating the flexing on both sides of the wood assembly.

6. The process of claim 1 further comprising positioning the waved assembly onto a panel and adhering the waved assembly thereto.

7. A process of making a waved wood product comprising:
assembling a flexible support sheet and a first wood sheet with an adhesive between the flexible support sheet and the first wood sheet, into a flat stacked assembly with the wood sheet having a given longitudinal wood grain orientation in the stacked assembly and the flexible support sheet being significantly more flexible than the first wood sheet, including partially activating the adhesive;
flexing the stacked assembly in a direction transverse to the wood grain orientation, thereby rendering the stacked assembly flexible in the transverse direction; and
subsequently to said flexing, shaping the flexed stacked assembly into a waved shape in the direction transverse to the wood grain orientation and setting the waved shape of the waved wood assembly by setting the adhesive, the waved wood assembly independently maintaining its waved shape thereafter.

8. The process of claim 7 wherein the assembling includes activating the adhesive and the step of shaping includes reactivating the adhesive.

9. The process of claim 7 wherein the assembling includes simultaneously assembling a second wood sheet to the flexible support sheet with an adhesive therebetween, the flexible support sheet being sandwiched between the two wood sheets in the stacked assembly; wherein both wood sheets have the same wood grain orientation in the stacked assembly.

10. The process of claim 7 wherein the waved shape has an angle $\alpha$ of above 50° from the transversal orientation.

11. The process of claim 7 wherein the step of assembling includes heat-pressing.

12. The process of claim 7 wherein the step of shaping includes heating the adhesive.

13. The process of claim 7 wherein the flexing includes repeating the flexing on both sides of the wood assembly.

14. The process of claim 7 further comprising positioning the waved assembly onto a panel and adhering the waved assembly thereto.

* * * * *